(12) United States Patent
Ishii et al.

(10) Patent No.: US 8,147,884 B2
(45) Date of Patent: Apr. 3, 2012

(54) SPARKLING ALCOHOLIC BEVERAGE AND PROCESS FOR PRODUCING THE SAME

(75) Inventors: Syuuichi Ishii, Yaizu (JP); Mitsuhiko Oda, Yaizu (JP); Atsuki Kawamura, Yaizu (JP)

(73) Assignee: Sapporo Breweries Limited, Tokyo (JP)

( * ) Notice: Subject to any disclaimer, the term of this patent is extended or adjusted under 35 U.S.C. 154(b) by 1423 days.

(21) Appl. No.: 10/564,063

(22) PCT Filed: Jun. 16, 2004

(86) PCT No.: PCT/JP2004/008463
§ 371 (c)(1),
(2), (4) Date: Jan. 11, 2007

(87) PCT Pub. No.: WO2005/005593
PCT Pub. Date: Jan. 20, 2005

(65) Prior Publication Data
US 2007/0178189 A1 Aug. 2, 2007

(30) Foreign Application Priority Data

Jul. 10, 2003 (JP) ................................. 2003-195202
May 20, 2004 (JP) ................................. 2004-150566

(51) Int. Cl.
*C12C 11/00* (2006.01)
(52) U.S. Cl. ........... 426/16; 426/11; 426/29; 426/330.4; 426/592
(58) Field of Classification Search .............. 426/11–16, 426/29, 330.4, 592
See application file for complete search history.

(56) References Cited

U.S. PATENT DOCUMENTS

| 3,720,517 | A | * | 3/1973 | Bavisotto et al. ................ 426/16 |
| 5,387,425 | A | * | 2/1995 | Hsu et al. ...................... 426/329 |
| 5,993,865 | A | | 11/1999 | Bech et al. |
| 5,994,113 | A | | 11/1999 | Kauppinen et al. |
| 6,177,123 | B1 | | 1/2001 | Stute et al. |
| 6,423,546 | B1 | | 7/2002 | Lusk et al. |
| 2005/0220935 | A1 | * | 10/2005 | Oono ............................. 426/11 |

FOREIGN PATENT DOCUMENTS

| EP | 0 360 007 | | 3/1990 |
| EP | 962522 | * | 12/1999 |
| GB | 101 406 | | 6/1917 |
| GB | 365 942 | | 1/1932 |
| GB | 556 486 | | 10/1943 |
| JP | 62-51971 | | 3/1987 |
| JP | 62 282576 | | 12/1987 |
| JP | 62-282576 | | 12/1987 |
| WO | 93/15181 | | 8/1993 |
| WO | 02 32232 | | 4/2002 |
| WO | WO 2004/000990 | * | 12/2003 |
| WO | 2005/005593 | | 1/2005 |

OTHER PUBLICATIONS

European Office Action issued Jul. 27, 2011, in European Patent Application No. 04 746 004.3 (with English Language Translation).
Ales to be proud of from Nottingham Brewery "Mushy Pea Beers", http://www.nottinghambrewery.com/Mushy.html. pp. 1-2, dated Jul. 19, 2011.
Home of Ancient Receipes "Brewing Page For Beer from Pea shells, a Ales recipe" Ale Recipes Beer From Pea Shells. http://www.celtnet.org.uk/recipes/brewing/fethc-recipe.php?rid=brew-beer-pea-shells, 4 pages, dated Jul. 19, 2011.

* cited by examiner

*Primary Examiner* — Vera Stulii
(74) *Attorney, Agent, or Firm* — Oblon, Spivak, McClelland, Maier & Neustadt, L.L.P.

(57) ABSTRACT

The present invention provides an alcoholic beverage with improved a foam stability. A processing method of an alcoholic beverage with improved foaming properties comprising a process for processing a pre-fermentation, wherein a pea protein which was extracted and was obtained from green peas is added to a pre-fermentation liquid. The alcoholic beverage with improved foaming properties can be applied to the processing method of the alcoholic beverage with improved foaming properties by fermenting the pre-fermentation liquid which created raw materials containing malts or by fermenting the pre-fermentation liquid created using a syrup containing sources of carbon, sources of nitrogen, hops, a coloring matter, an improving substance for a generating of foam and for the foam stability and water as raw materials with a brewers' yeast.

8 Claims, No Drawings

SPARKLING ALCOHOLIC BEVERAGE AND PROCESS FOR PRODUCING THE SAME

FIELD OF THE INVENTION

This invention generally relates to a malt alcoholic beverage such as beer and low-malt beer, and a beer-taste alcoholic beverage (it names generically below and is called an "alcoholic beverage with foaming properties"), which does not contain malts or any barley, wheat, etc. at all, and more particularly, to the alcoholic beverage with improved foaming properties such as a degree of foaming and a continuity of the foam layer (a foam stability) and method for its processing.

BACKGROUND ART OF THE INVENTION

With malt alcoholic beverages such as beer and low-malt beer which use barley malt as materials, using starch like rice, barley, wheat, corn starch as adjuncts other than malt, an activity enzyme of malt is used (for example, enzyme itself may be added to low-malt beer.), then malts or the starch of malts and adjuncts are made to mash, and after adding hops to an obtained a wort, then a brewers' yeast is added and an alcoholic fermentation is carried out.

On the other hand, unlike a malt alcoholic beverages, there is an alcoholic beverage that does not use brewing operation including process of steeping, germination and kilning, and process of liquefaction and mashing, that is, a beer-taste alcoholic beverage, which does not contain any malt or barley or wheat, etc. at all (alcoholic beverage by which a flavor is similar to beer) is disclosed. For alcoholic beverages, materials liquid is processed and created by adding a syrup containing sources of carbon, sources of nitrogen such as amino acid content material, water, hops, a coloring matter, an improving substance for a generation of foam and for the foam stability, and necessity spices, then the brewers' yeast is added to the materials liquid as same as usual beer brewing process, and the alcoholic fermentation is carried out. Nowadays, its development is progressing towards realization. (JP Publication number 2001-37462)

In these alcoholic beverages with foaming properties, there are important properties like the degree of foaming and the foam stability. For example, when beer is poured into a glass or beer mug, a form layer is created on a surface of the poured beer. This foam layer intercepts beer surface from air while impressing beer visually to a drink person, and it has the important function to confine a beer's taste. Therefore, moderate degree of foaming and the foam stability are properties indispensable to beer.

However, with conventional malt alcoholic beverages, since the degree of foaming and the foam stability as an alcoholic beverage of a final product are greatly affected by brewing process management of selection of malts' materials or adjuncts, a quality of malts, or a temperature control of the mashing process, thus an effort spent on these processing control has accounted for the remarkable ratio among all brewing processes.

Moreover, in an alcoholic beverage with foaming properties, any development of the improving material suitable for the generation of foaming and the foam stability is to be needed.

Although the improving material for the degree of foaming and the foam stability described above in the alcoholic beverage with foaming properties has been proposed to use as one method to improve the degree of foaming and the foam stability in alcoholic beverages with foaming properties, it has not been proposed concretely yet.

DISCLOSURE OF THE INVENTION

Problem to be Solved by the Invention

It is a general object of the present invention to provide an effective raw material for improving the degree of foaming and the foam stability, and any useful methods of materials or additives for processing the alcoholic beverage with improved foaming properties.

Means for Solving the Problem

In order to achieve the above-mentioned object, there is provided according to one aspect of the present invention a processing method of an alcoholic beverage with improved foaming properties comprising:

a mashing process which liquefies and mashes malts, or malts and adjuncts, a first filtration process which filters the mash and obtains a wort, a boiling process which creates pre-fermentation liquid by adding hops to the wort and boiling, a process which ferments the pre-fermentation liquid using a brewers' yeast, a second filtration process which filters the alcoholic beverage with improved foaming properties through the fermentation process, wherein a pea protein which was extracted and was obtained from green peas is added to either each process before the second filtration process or between the each processes.

There is also provided according to another aspect of the present invention a processing method of an alcoholic beverage with improved foaming properties comprising:

a process for processing a pre-fermentation liquid using a syrup containing sources of carbon, sources of nitrogen, hops, a coloring matter and water as raw materials, a process for obtaining the alcohol beverage with improved foaming properties by fermenting the pre-fermentation liquid with a brewers' yeast, a filtration process which filters the alcoholic beverage with improved foaming properties which passed through the fermentation process, wherein a pea protein which was extracted and was obtained from green peas is added to either each process before the filtration process or between the each processes.

There is also provided according to another aspect of the present invention a processing method of an alcoholic beverage with improved foaming properties by fermenting a pre-fermentation liquid, wherein a pea protein which was extracted and was obtained from green peas is added to the pre-fermentation liquid.

There is also provided according to another aspect of the present invention a processing method of a alcoholic beverage with improved foaming properties by fermenting a pre-fermentation liquid which created raw materials containing a malt at mashing process, wherein a pea protein which was extracted and was obtained from green peas is added to the pre-fermentation liquid.

There is also provided according to another aspect of the present invention an alcoholic beverage with improved foaming properties processed by processing method as claimed in claims 1-4.

The pea protein used by the present invention is vegetable protein which extracted and carried out purification and separation steps and which was obtained from green peas, and can be commercially available.

Effect of the Invention

According to the present invention, the alcoholic beverage with improved foaming properties can be obtained due to the pea protein is added to either each process or between each process of processing method for the alcoholic beverage with improved foaming properties. Moreover, the pea protein can be commercially available and easily obtained, and only added to its processing, thus the processing method will not be complicated at all. In addition, a final product of the alcoholic beverage due to the above processing method is superior in the generation of foaming and the foam stability. Also, the present invention can offer the alcoholic beverage with improved foaming properties which gives customer's preferable taste and is visually desirable for them.

THE BEST MODE FOR CARRYING OUT THE INVENTION

Examples will be shown as follow to explain the present invention in detail.
Embodiments A description will now be given, with reference to the embodiments according to the method of the present invention. Here, combining the suitable sources of nitrogen and the raw material which improves the foaming properties or using any one of them, a plurality of test brewing were carried out and explained. These embodiments were experimentally carried out in 400 liter-sized brewing facilities. 21 types of alcoholic beverages with foaming properties and 2 types of low-malt beer were processed, and comparison tests for the foam stability, and also comparison tests tasting the fermentability flavors were performed. The process conditions except raw material made all the same, and, finally, as for embodiments 1-7, they adjusted to alcoholic 5.0 volume %. Similarly, process conditions other than which raw materials also made the embodiment 8 the same, and, finally it adjusted them to 5.5 volume %.

In addition, although there are three kinds of green peas (*Pisum Sativum L*), yellow, green, and red, the green peas used for the following embodiments were yellow peas, and used the pea protein extracted from these yellow green peas.
First Embodiment In the first embodiment, it is shown that a pea protein (pea protein from Rhodia Organo food Tech corp., also it is below the same.), a soybean protein (Showa fresh from Showa Sangyo CO., LTD, also it is below the same.) were used as the foam improving material added to the method for processing the alcoholic beverage with foaming properties that the pre-fermentation liquid was created with syrup like containing sources of carbon, hops, the coloring matter, the improving substance in the generation of foaming and the foam stability, and water as raw materials and without using malts and any sources of nitrogen at all, then the pre-fermentation liquid was processed by adding the brewers' yeast, and the alcoholic fermentation was carried out. Following is steps to implement the embodiment.

1. The pre-fermentation liquid was adjusted using the following materials.

Used materials: in order to process the alcoholic beverage with foaming properties, materials were set to syrup 69 kg (75% of solid parts, Syrup used the product of DE50 and it is commercially available. DE is an abbreviation of Dextrose Equivalent). Then, 3 samples of alcoholic beverage with foaming properties were processed according to the method described above. One was processed not using the foam improving material (#1-1), second was using 2000 g of the pea protein (#1-2), and the other was using 2000 g of soybean protein (#1-3), respectively.

Specifically, 300-350 L of hot water was added to 240 g of caramel coloring matter (Kokuyo caramel from Ikeda Tohka Industries CO., LTD) and 400 g of a hop pellet, syrup was dissolved further, and this mixture was boiled for 60-90 minutes.

Then, spent hops etc. was removed from the mixture by the settling tank called Whirlpool, the remaining mixture was cooled by the plate cooler to 10 degrees Celsius, and the pre-fermentation liquid was obtained. The brewers' yeast was added in this pre-fermentation liquid, and it was made to ferment at 6-12 degrees Celsius (its fermentation period will be indicated below.). Then, it stored at −1 degrees Celsius.

Dosing the kieselguhr, the fermentation liquid was filtrated, removed the yeast, and obtained 3 types of final alcoholic beverage with foaming properties.

As mentioned above, in this embodiment, using the two kinds of raw materials which improve foam properties, alcoholic beverage with foaming properties were processed and it investigated about the foam properties of these three samples. These foam properties were performed by measuring each NIBEM value which shows the foam stability. The NIBEM value is an index value which generally evaluates the foam stability of alcoholic beverages with foaming properties, such as beer and low-malt beer. That is, if a NIBEM value is high, the foam stability can estimate that it is good.

TABLE 1

|       | #1-1 | #1-2 | #1-3 |
|-------|------|------|------|
| NIBEM | 57   | 160  | 64   |

Table 1 shows NIBEM value for each sample.
From the data shown in Table 1, it was verified that #1-2 which used pea protein have the foam properties which was superior as compared with #1-1 and #1-3.

TABLE 2

|                    | #1-1 | #1-2 | #1-3 |
|--------------------|------|------|------|
| THE SMELL OF SULFIDE | 3    | 2    | 3    |
| THE SCENT OF ESTER   | 0    | 1    | 1    |
| AFTERTASTE           | 0    | 1    | 0    |

For every item, the valuation basis of Table 2 is as follows, and was set as 3 stage evaluations.

The smell of sulfide: 0 (more weak), 1 (weak), 2 (average), 3 (more strong)

The scent of ester: 0 (more weak), 1 (weak), 2 (average), 3 (more strong)

Aftertaste: 0 (no refreshing drinkability), 1 (less refreshing drinkability), 2 (average), 3 (more refreshing drinkability)

The taste evaluation of Table 2 was based on #1-1.

In addition, in this embodiment, neither of the samples of evaluation of "aftertaste" was good. Since this has not added any sources of nitrogen at the processing of each sample, so that fermentation stopped on the way, and there were more residual extract parts than predetermined, thereby sweet taste was felt more by the amount of this residual extract, and influence appeared in aftertaste by it. However, also in such a situation, compared with other samples (#1-1 and #1-3), the smell of sulfide was felt less, and the scent of ester and aftertaste exceeded clearly the sample which used pea protein (#1-2).

TABLE 3

|  | #1-1 | #1-2 | #1-3 |
|---|---|---|---|
| FERMENTATION PERIOD | 12* | 11* | 12* |

*THE TENTATIVE EXTRACT STOPPED AT 4% IN THE COURSE OF FERMENTATION

Table 3 compares the fermentation period in processing of the alcoholic beverage with foaming properties in this embodiment. Although the fermentation period aimed at the period until the extract of pre-fermentation liquid becomes 2.5% from 11% with an apparent extract, they did not fall to 4% with the apparent extract in this embodiment. The apparent extract was an extract led from the specific gravity of the alcohol produced from sugars in the pre-fermentation liquid by fermentation and sugars which have not fermented, more specifically, extracted the fermentation liquid in the fermentation process, and measured it with the densitometer. Although the usual fermentation period is seven to nine days, with no regards to there is fermentable sugar which the yeast can do in fermentation liquid in this embodiment, as for fermentation, the apparent extract stopped at 4%.

TABLE 4

|  | #1-1 | #1-2 | #1-3 |
|---|---|---|---|
| NITROGEN OF THE FREE AMINO ACID (mg/L) | 5 | 8 | 9 |

Table 4 shows the quantity of the nitrogen of the free amino acid form in the pre-fermentation liquid before adding the yeast in this embodiment. Since desirable fermentation was not made, it is desirable to supply the source of nitrogen further.

Second Embodiment

In the second embodiment, it is shown that pea protein, soybean protein were used as the foam improving material added to the method for processing the alcoholic beverage with foaming properties that the pre-fermentation liquid was created with syrup like containing sources of carbon, hops, the coloring matter, the improving substance in the generation of foam and the foam stability, and water as raw materials and using not any malts as sources of nitrogen but decompositions of soybean protein (High-Nyuto from Fuji-Seiyu CO., LTD), then the pre-fermentation liquid was processed by adding the brewers' yeast, and the alcoholic fermentation was carried out. Following is steps to implement the embodiment.

1. The pre-fermentation liquid was adjusted using the following materials.

Used materials: in order to process the alcoholic beverage with foaming properties, materials were set to syrup 69 kg (75% of solid parts, Syrup used the product of DE50 and it is commercially available. DE is an abbreviation of Dextrose Equivalent). 400 g of decompositions of soybean protein were used as sources of nitrogen. Then, 3 samples of alcoholic beverage with foaming properties were processed according to the method described above. They were processed in 3 ways, in which one was not using the foam improving material (#2-1), second sample was using 2000 g of pea protein (#2-2), and the other was using 2000 g of soybean protein (#2-3), respectively.

Specifically, 300-350 L of hot water was added to 240 g of caramel coloring matter and 400 g of a hop pellet, syrup was dissolved further, and this mixture was boiled for 60-90 minutes.

Then, spent hops etc. was removed from the mixture by the settling tank called Whirlpool, the remaining mixture was cooled by the plate cooler to 10 degrees Celsius, and pre-fermentation liquid was obtained. The brewers' yeast was added in this pre-fermentation liquid, and it was made to ferment at 6-12 degrees Celsius (its fermentation period will be indicated below.). Then, it stored at −1 degrees Celsius.

Dosing the kieselguhr, the fermentation liquid was filtrated, removed the yeast, and obtained the final alcoholic beverage with foaming properties.

Hereafter, the foam stability, the taste evaluation, the fermentation period, and the amount of isolation amino acid are shown in Table 5 to Table 8 like an embodiment 1, respectively.

TABLE 5

|  | #2-1 | #2-2 | #2-3 |
|---|---|---|---|
| NIBEM | 82 | 158 | 90 |

Table 5 shows NIBEM value for each sample.

From the data shown in Table 5, it was verified that #2-2 which used pea protein have the foam properties which was superior as compared with #2-1 and #2-3.

TABLE 6

|  | #2-1 | #2-2 | #2-3 |
|---|---|---|---|
| THE SMELL OF SULFIDE | 3 | 2 | 3 |
| THE SCENT OF ESTER | 0 | 1 | 1 |
| AFTERTASTE | 0 | 2 | 0 |

For every item, the valuation basis of Table 6 is as follows, and was set as 3 stage evaluations.

The smell of sulfide: 0 (more weak), 1 (weak), 2 (average), 3 (more strong)

The scent of ester: 0 (more weak), 1 (weak), 2 (average), 3 (more strong)

Aftertaste: 0 (no refreshing drinkability), 1 (less refreshing drinkability), 2 (average), 3 (more refreshing drinkability)

The taste evaluation of Table 6 was based on #2-1.

As a result of performing the taste evaluation by 10 panelists, compared with #2-1 and #2-3, the smell of sulfide was reduced more, the scent of ester was increased, and refreshing drinkability was increased in aftertaste for #2-2 which used pea protein, so the feature desirable for malt alcoholic beverages, such as beer and low-malt beer, was reinforced.

TABLE 7

|  | #2-1 | #2-2 | #2-3 |
|---|---|---|---|
| FERMENTATION PERIOD | 8 | 7 | 8 |

Table 7 compares the fermentation period in the processing of the alcoholic beverage with foaming properties in this embodiment. The fermentation period aimed at the period until the extract of pre-fermentation liquid becomes 2.5% from 11% with the apparent extract. The apparent extract was extracted from the fermentation liquid in the fermentation process, and measured it with the densitometer. Although the usual fermentation period is seven to nine days, compared with #2-1 and #2-3, as for #2-2, fermentation period was shortened 1 day as the result indicates.

TABLE 8

|  | #2-1 | #2-2 | #2-3 |
|---|---|---|---|
| NITROGEN OF THE FREE AMINO ACID (mg/L) | 23 | 27 | 25 |

Table 8 shows the quantity of the nitrogen of the free amino acid form in the pre-fermentation liquid before adding the yeast in this embodiment. In both the sample of #2-2 using pea proteins, and the sample of #2-3 using soybean proteins, compared with #2-1, values were increased slightly.

Third Embodiment

In the third embodiment, the source of nitrogen included in the rice syrup (Decompositions of rice from Gun ei chemical industry, and it is commercially available) which was used of a part of the syrup used as a source of carbon was. used without using malt as sources of nitrogen. It is shown that pea proteins, soybean proteins were used as the foam improving material added to the method for processing the alcoholic beverage with foaming properties that the pre-fermentation liquid was created with the above described syrup like containing rice syrup, hops, the coloring matter, the improving substance in the generation of foam and the foam stability, and water as raw materials and not using any malts as sources of nitrogen at all, then the pre-fermentation liquid was processed by adding the brewers' yeast, and the alcoholic fermentation was carried out. Following is steps to implement the embodiment.

1. The pre-fermentation liquid was adjusted using the following materials.

Used materials: in order to process the alcoholic beverage with foaming properties, materials were set to syrup 69 kg (75% of solid parts, 52.1 kg of Syrup for DE50, the rice syrup was used for the rest in 6.9 kg and they are both commercially available.). As sources of nitrogen, 6.9 kg out of the 69 kg of Syrup was replaced with the rice syrup, then sources of nitrogen included in the rice syrup was used. Then, 3 samples of alcoholic beverage with foaming properties were processed according to the method described above. They were processed in 3 ways, in which one was not using the foam improving material (#3-1), second sample was using 2000 g of pea protein (#3-2), and the other was using 2000 g of soybean protein (#3-3), respectively.

Specifically, 300-350 L of hot water was added to 240 g of caramel coloring matter and 400 g of a hop pellet, syrup was dissolved further, and this mixture was boiled for 60-90 minutes.

Then, spent hops etc. was removed from the mixture by the settling tank called Whirlpool, the remaining mixture was cooled by the plate cooler to 10 degrees Celsius, and pre-fermentation liquid was obtained. The brewers' yeast was added in this pre-fermentation liquid, and it was made to ferment at 6-12 degrees Celsius (its fermentation period will be indicated below.). Then, it stored at −1 degrees Celsius.

Dosing the kieselguhr, the fermentation liquid was filtrated, removed the yeast, and obtained the final alcoholic beverage with foaming properties.

TABLE 9

|  | #3-1 | #3-2 | #3-3 |
|---|---|---|---|
| NIBEM | 57 | 170 | 55 |

Table 9 shows NIBEM value for each sample.

From the data shown in Table 9, it was verified that #3-2 which used pea protein have the foam properties which was superior as compared with #3-1 and #3-3.

TABLE 10

|  | #3-1 | #3-2 | #3-3 |
|---|---|---|---|
| THE SMELL OF SULFIDE | 1 | 0 | 0 |
| THE SCENT OF ESTER | 1 | 3 | 2 |
| AFTERTASTE | 1 | 3 | 1 |

For every item, the valuation basis of Table 10 is as follows, and was set as 3 stage evaluations.

The smell of sulfide: 0 (more weak), 1 (weak), 2 (average), 3 (more strong)

The scent of ester: 0 (more weak), 1 (weak), 2 (average), 3 (more strong)

Aftertaste: 0 (no refreshing drinkability), 1 (less refreshing drinkability), 2 (average), 3 (more refreshing drinkability)

The taste evaluation of Table 10,was based on #3-1.

As a result of performing the taste evaluation by 10 panelists, compared with #3-1 and #3-3, the smell of sulfide was reduced more, the scent of ester was increased, and refreshing drinkability was increased in aftertaste for #3-2 which used pea protein, so the feature desirable for malt alcoholic beverages, such as beer and low-malt beer, was reinforced.

TABLE 11

|  | #3-1 | #3-2 | #3-3 |
|---|---|---|---|
| FERMENTATION PERIOD | 8 | 7 | 7 |

Table 11 compares the fermentation period in the processing of alcoholic beverage with foaming properties in this embodiment. The fermentation period aimed at the period until the extract of the pre-fermentation liquid becomes 2.5% from 11% with the apparent extract. The apparent extract was extracted from the fermentation liquid in the fermentation process, and measured it with the densitometer. Although the usual fermentation period is seven to nine days, compared with #3-1, as for #3-2 and #3-3, fermentation period was shortened 1 day as the result indicates.

TABLE 12

|  | #3-1 | #3-2 | #3-3 |
|---|---|---|---|
| NITROGEN OF THE FREE AMINO ACID (mg/L) | 20 | 24 | 23 |

Table 12 shows the quantity of the nitrogen of the free amino acid form in the pre-fermentation liquid before adding the yeast in this embodiment. In both the sample of #3-2 using pea proteins, and the sample of #3-3 using soybean proteins, compared with #3-1, values were increased slightly.

Fourth Embodiment

In the fourth embodiment, it is shown that pea protein and soybean protein were used as the foam improving material added to the method for processing the alcoholic beverage with foaming properties that the pre-fermentation liquid was created with syrup like containing sources of carbon, hops, the coloring matter, the improving substance in the generation of foam and the foam stability, and water as raw materials and using not malts as sources of nitrogen but protein powders of a corn (Decompositions of corn protein and it is commercially available), then the pre-fermentation liquid was processed by adding the brewers' yeast, and the alcoholic fermentation was carried out. Following is steps to implement the embodiment.

1. The pre-fermentation liquid was adjusted using the following materials.

Used materials: in order to process the alcoholic beverage with foaming properties, materials were set to syrup 69 kg (75% of solid parts, Syrup used the product of DE50 and it is commercially available. DE is an abbreviation of Dextrose Equivalent). 240 g of protein powders of corn was used as sources of nitrogen. Then, 3 samples of alcoholic beverage with foaming properties were processed according to the method described above. They were processed in 3 ways, in which one was not using the foam improving material (#4-1), second sample was using 2000 g of pea protein (#4-2), and the other was using 2000 g of soybean protein (#4-3), respectively.

Specifically, 300-350 L of hot water was added to 240 g of caramel coloring matter and 400 g of a hop pellet, syrup was dissolved further, and this mixture was boiled for 60-90 minutes.

Then, spent hops etc. was removed from the mixture by the settling tank called Whirlpool, the remaining mixture was cooled by the plate cooler to 10 degrees Celsius, and the pre-fermentation liquid was obtained. The brewers' yeast was added in this pre-fermentation liquid, and it was made to ferment at 6-12 degrees Celsius (its fermentation period will be indicated below.). Then, it stored at −1 degrees Celsius.

Dosing the kieselguhr, the fermentation liquid was filtrated, removed the yeast, and obtained the final alcoholic beverage with foaming properties.

Hereafter, the foam stability, the taste evaluation, the fermentation period, and the amount of isolation amino acid are shown in Table 13 to Table 16 like an embodiment 3, respectively.

TABLE 13

|  | #4-1 | #4-2 | #4-3 |
|---|---|---|---|
| NIBEM | 52 | 161 | 82 |

Table 13 shows NIBEM value for each sample.

From the data shown in Table 13, it was verified that #4-2 which used pea protein have the foam properties which was superior as compared with #4-1 and #4-3.

TABLE 14

|  | #4-1 | #4-2 | #4-3 |
|---|---|---|---|
| THE SMELL OF SULFIDE | 2 | 0 | 1 |
| THE SCENT OF ESTER | 1 | 2 | 2 |
| AFTERTASTE | 1 | 3 | 1 |

For every item, the valuation basis of Table 14 is as follows, and was set as 3 stage evaluations.

The smell of sulfide: 0 (more weak), 1 (weak), 2 (average), 3 (more strong)

The scent of ester: 0 (more weak), 1 (weak), 2 (average), 3 (more strong)

Aftertaste: 0 (no refreshing drinkability), 1 (less refreshing drinkability), 2 (average), 3 (more refreshing drinkability)

The taste evaluation of Table 14 was based on #4-1.

As a result of performing the taste evaluation by 10 panelists, compared with #4-1 and #4-3, the smell of sulfide was reduced more, the scent of ester was increased, and refreshing drinkability was increased in aftertaste for #4-2 which used pea protein, so the feature desirable for malt alcoholic beverages, such as beer and low-malt beer, was reinforced.

TABLE 15

|  | #4-1 | #4-2 | #4-3 |
|---|---|---|---|
| FERMENTATION PERIOD | 8 | 7 | 8 |

Table 15 compares the fermentation period in the processing of alcoholic beverage with foaming properties in this embodiment. The fermentation period aimed at the period until the extract of the pre-fermentation liquid becomes 2.5% from 11% with the apparent extract. The apparent extract was extracted from the fermentation liquid in the fermentation process, and measured it with the densitometer. Although the usual fermentation period is seven to nine days, compared with #4-1 and #4-3, as for #4-2, the fermentation period was shortened 1 day as the result indicates.

TABLE 16

|  | #4-1 | #4-2 | #4-3 |
|---|---|---|---|
| NITROGEN OF THE FREE AMINO ACID (mg/L) | 19 | 21 | 23 |

Table 16 shows the quantity of the nitrogen of the free amino acid form in the pre-fermentation liquid before adding the yeast in this embodiment. In both the sample of #4-2 using pea proteins, and the sample of #4-3 using soybean protein, compared with #4-1, values were increased slightly.

Fifth Embodiment

In the fifth embodiment, it is shown that pea protein and soybean protein were used as the foam improving material added to the method for processing the alcoholic beverage with foaming properties that the pre-fermentation liquid was created with syrup like containing sources of carbon, hops, the coloring matter, the improving substance in the generation of foam and the foam stability, and water as raw materials and using not malts as sources of nitrogen but protein powders of a corn (Decompositions of corn protein and it is commercially available) and a yeast extract (Extract solution of dried yeast from Sapporo Breweries LTD., and it is commercially available), then the pre-fermentation liquid was processed by adding the brewers' yeast, and the alcoholic fermentation was carried out. Following is steps to implement the embodiment.

1. The pre-fermentation liquid was adjusted using the following materials.

Used materials: in order to process the alcoholic beverage with foaming properties, materials were set to syrup 69 kg (75% of solid parts, Syrup used the product of DE50 and it is commercially available. DE is an abbreviation of Dextrose Equivalent). 120 g of protein powders of corn and 60 g of the yeast extract were used as sources of nitrogen. Then, 3 samples of alcoholic beverage with foaming properties were processed according to the method described above. They were processed in 3 ways, in which one was not using the foam improving material (#5-1), second sample was using 2000 g of pea protein (#5-2), and the other was using 2000 g of soybean protein (#5-3), respectively.

Specifically, 300-350 L of hot water was added to 240 g of caramel coloring matter and 400 g of a hop pellet, syrup was dissolved further, and this mixture was boiled for 60-90 minutes.

Then, spent hops etc. was removed from the mixture by the settling tank called Whirlpool, the remaining mixture was cooled by the plate cooler to 10 degrees Celsius, and pre-fermentation liquid was obtained. The brewers' yeast was added in this pre-fermentation liquid, and it was made to ferment at 6-12 degrees Celsius (Its fermentation period will be indicated below.). Then, it stored at −1 degrees Celsius.

Dosing the kieselguhr, the fermentation liquid was filtrated, removed the yeast, and obtained the final alcoholic beverage with foaming properties.

Hereafter, the foam stability, the taste evaluation, the fermentation period, and the amount of isolation amino acid are shown in Table 17 to Table 20 for the embodiment 5, respectively.

TABLE 17

|  | #5-1 | #5-2 | #5-3 |
|---|---|---|---|
| NIBEM | 115 | 164 | 124 |

Table 17 shows NIBEM value for each sample.

From the data shown in Table 17, it was verified that #5-2 which used pea protein have the foam properties which was superior as compared with #5-1 and #5-3.

TABLE 18

|  | #5-1 | #5-2 | #5-3 |
|---|---|---|---|
| THE YEASTY FLAVOR | 3 | 3 | 3 |
| THE SCENT OF ESTER | 1 | 1 | 1 |
| AFTERTASTE | 0 | 0 | 0 |

For every item, the valuation basis of Table 18 is as follows, and was set as 3 stage evaluations.

The yeasty flavor: 0 (more weak), 1 (weak), 2 (average), 3 (more strong)

The scent of ester: 0 (more weak), 1 (weak), 2 (average), 3 (more strong)

Aftertaste: 0 (no refreshing drinkability), 1 (less refreshing drinkability), 2 (average), 3 (more refreshing drinkability)

The taste evaluation of Table 18 was based on #5-1.

As a result of performing the taste evaluation by 10 panelists, all sample shows same result in the yeasty flavor and the scent of ester.

TABLE 19

|  | #5-1 | #5-2 | #5-3 |
|---|---|---|---|
| FERMENTATION PERIOD | 6 | 5 | 6 |

Table 19 compares the fermentation period in the processing of alcoholic beverage with foaming properties in this embodiment. The fermentation period aimed at the period until the extract of pre-fermentation liquid becomes 2.5% from 11% with the apparent extract. The apparent extract was extracted from the fermentation liquid in the fermentation process, and measured it with the densitometer. Although the usual fermentation period is seven to nine days, compared with #5-1 and #5-3, as for #5-2, the fermentation period was shortened 1 day as the result indicates.

TABLE 20

|  | #5-1 | #5-2 | #5-3 |
|---|---|---|---|
| NITROGEN OF THE FREE AMINO ACID (mg/L) | 83 | 84 | 95 |

Table 20 shows the quantity of the nitrogen of the free amino acid form in the pre-fermentation liquid before adding the yeast in this embodiment. In both the sample of #5-2 using pea proteins, and the sample of #5-3 using soybean protein, compared with #5-1, values were increased slightly.

Sixth Embodiment

In the sixth embodiment, it is shown that pea protein and soybean protein were used as the foam improving material added to the method for processing the alcoholic beverage with foaming properties that the pre-fermentation liquid was created with syrup like containing sources of carbon, hops, the coloring matter, the improving substance in the generation of foam and the foam stability, and water as raw materials and using not malts as sources of nitrogen but protein powders of a corn (Decompositions of corn protein and it is commercially available) and ammonium sulfate, then the pre-fermentation liquid was processed by adding the brewers' yeast, and the alcoholic fermentation was carried out. Following is steps to implement the embodiment.

1. The pre-fermentation liquid was adjusted using the following materials.

Used materials: in order to process the alcoholic beverage with foaming properties, materials were set to syrup 69 kg (75% of solid parts, Syrup used the product of DE50 and it is commercially available. DE is an abbreviation of Dextrose Equivalent). 240 g of protein powders of corn and 26 g of ammonium sulfate were used as sources of nitrogen. Then, 3 samples of alcoholic beverage with foaming properties were processed according to the method described above. They were processed in 3 ways, in which one was not using the foam improving material (#6-1), second sample was using 2000 g of pea protein (#6-2), and the other was using 2000 g of soybean protein (#6-3), respectively.

Specifically, 300-350L of hot water was added to 240 g of caramel coloring matter and 400 g of a hop pellet, syrup was dissolved further, and this mixture was boiled for 60-90 minutes.

Then, spent hops etc. was removed from the mixture by the settling tank called Whirlpool, the remaining mixture was cooled by the plate cooler to 10 degrees Celsius, and the pre-fermentation liquid was obtained. The brewers' yeast was added in this pre-fermentation liquid, and it was made to ferment at 6-12 degrees Celsius (its fermentation period will be indicated below.). Then, it stored at −1 degrees Celsius.

Dosing the kieselguhr, the fermentation liquid was filtrated, removed the yeast, and obtained the final alcoholic beverage with foaming properties.

Hereafter, the foam stability, the taste evaluation, the fermentation period, and the amount of isolation amino acid are shown in Table 21 to Table 24 for the embodiment 6, respectively.

TABLE 21

|  | #6-1 | #6-2 | #6-3 |
|---|---|---|---|
| NIBEM | 52 | 165 | 62 |

Table 21 shows NIBEM value for each sample.

From the data shown in Table 21, it was verified that #6-2 which used pea protein have the foam properties which was superior as compared with #6-1 and #6-3.

TABLE 22

|  | #6-1 | #6-2 | #6-3 |
|---|---|---|---|
| THE SMELL OF SULFIDE | 1 | 0 | 0 |
| THE SCENT OF ESTER | 1 | 3 | 2 |
| AFTERTASTE | 1 | 3 | 1 |

For every item, the valuation basis of Table 22 is as follows, and was set as 3 stage evaluations.

The smell of sulfide: 0 (more weak), 1 (weak), 2 (average), 3 (more strong)

The scent of ester: 0 (more weak), 1 (weak), 2 (average), 3 (more strong)

Aftertaste: 0 (no refreshing drinkability), 1 (less refreshing drinkability), 2 (average), 3 (more refreshing drinkability)

The taste evaluation of Table 22 was based on #6-1.

As a result of performing the taste evaluation by 10 panelists, compared with #6-1, for not only #6-2 but also #6-3, the smell of sulfide was reduced equally, however, compared with #6-1 and #6-3, the scent of ester was increased and refreshing drinkability was increased in aftertaste for #6-2 which used pea protein, so the feature desirable for malt alcoholic beverages, such as beer and low-malt beer, was reinforced.

TABLE 23

|  | #6-1 | #6-2 | #6-3 |
|---|---|---|---|
| FERMENTATION PERIOD | 6 | 5 | 6 |

Table 23 compares the fermentation period in the processing of the alcoholic beverage with foaming properties in this embodiment. The fermentation period aimed at the period until the extract of the pre-fermentation liquid becomes 2.5% from 11% with the apparent extract. The apparent extract was extracted from the fermentation liquid in the fermentation process, and measured it with the densitometer. Although the usual fermentation period is seven to nine days, compared with #6-1 and #6-3, as for #6-2, the fermentation period was shortened 1 day as the result indicates.

TABLE 24

|  | #6-1 | #6-2 | #6-3 |
|---|---|---|---|
| NITROGEN OF THE FREE AMINO ACID (mg/L) | 24 | 28 | 25 |

Table 24 shows the quantity of the nitrogen of the free amino acid form in the pre-fermentation liquid before adding the yeast in this embodiment. In both the sample of #6-2 using pea proteins, and the sample of #6-3 using soybean protein, compared with #6-1, values were increased slightly.

Seventh Embodiment

In the seventh embodiment, it is shown that pea protein and soybean protein were used as the foam improving material added to the method for processing the alcoholic beverage with foaming properties that the pre-fermentation liquid was created with syrup like containing sources-of carbon, hops, the coloring matter, the improving substance in the generation of foam and the foam stability, and water as raw materials and using not malts as sources of nitrogen but White sorghum (the grinding powder of the white sorghum currently called Sorghum grains or Indian millet in Japan and it is commercially available) and ammonium sulfate, then the pre-fermentation liquid was processed by adding the brewers' yeast, and the alcoholic fermentation was carried out. Following is steps to implement the embodiment.

1. The pre-fermentation liquid was adjusted using the following materials.

Used materials: in order to process the alcoholic beverage with foaming properties, materials were set to syrup 34.5 kg (75% of solid parts, Syrup used the product of DE50 and it is commercially available. DE is an abbreviation-of Dextrose Equivalent). 34.5 kg of the grinding powder of the white sorghum, 34.5 g of alpha amylase, 34.5 g of beta amylase and 34.5 g of protease were used as sources of nitrogen. Then, 3 samples of alcoholic beverage with foaming properties were processed according to the method described above. They were processed in 3 ways, in which one was not using the foam improving material (#7-1), second sample was using 2000 g of pea protein (#7-2), and the other was using 2000 g of soybean protein (#7-3), respectively.

Specifically, 150-175 L of hot water was added to the grinding powder of the white sorghum, alpha amylase, beta amylase and protease, and this mixture was kept at 48 degrees Celsius for 20 minutes. Then, the mixture was heated up to 65 degrees Celsius and kept for 25 minutes, and heated up further to 75 degrees Celsius. Then, 150-175 L of hot water was added to 240 g of the caramel coloring matter and 400 g of the hop pellet, then the syrup was dissolved further, and this mixture was boiled for 60-90 minutes.

Then, spent hops etc. was removed from the mixture by the settling tank called Whirlpool, the remaining mixture was cooled by the plate cooler to 10 degrees Celsius, and the pre-fermentation liquid was obtained. The brewers' yeast was added in this pre-fermentation liquid, and it was made to ferment at 6-12 degrees Celsius (its fermentation period will be indicated below.). Then, it stored at −1 degrees Celsius.

Dosing the kieselguhr, the fermentation liquid was filtrated, removed the yeast, and obtained the final alcoholic beverage with foaming properties.

TABLE 25

|  | #7-1 | #7-2 | #7-3 |
|---|---|---|---|
| NIBEM | 137 | 166 | 149 |

Table 25 shows NIBEM value for each sample.

From the data shown in Table 25, it was verified that #7-2 which used pea protein have the foam properties which was superior as compared with #7-1 and #7-3.

TABLE 26

|  | #7-1 | #7-2 | #7-3 |
|---|---|---|---|
| THE SMELL OF SULFIDE | 1 | 0 | 0 |
| THE SCENT OF ESTER | 2 | 3 | 2 |
| AFTERTASTE | 1 | 1 | 1 |

For every item, the valuation basis of Table 26 is as follows, and was set as 3 stage evaluations.

The smell of sulfide: 0 (more weak), 1 (weak), 2 (average), 3 (more strong)

The scent of ester: 0 (more weak), 1 (weak), 2 (average), 3 (more strong)

Aftertaste: 0 (no refreshing drinkability), 1 (less refreshing drinkability), 2 (average), 3 (more refreshing drinkability)

The taste evaluation of Table 26 was based on #7-1.

As a result of performing the taste evaluation by 10 panelists, compared with #7-1, the smell of sulfide was reduced more for #7-2 which used pea protein and #7-3 which used soybean protein, and comparing #7-1 and #7-3, the scent of ester was increased for #7-2, but the refreshing drinkability was same for all samples.

TABLE 27

|  | #7-1 | #7-2 | #7-3 |
|---|---|---|---|
| FERMENTATION PERIOD | 5 | 5 | 5 |

Table 27 compares the fermentation period in the processing of the alcoholic beverage with foaming properties in this embodiment. The fermentation period aimed at the period until the extract of pre-fermentation liquid becomes 2.5% from 11% with the apparent extract. The apparent extract was extracted from the fermentation liquid in the fermentation process, and measured it with the densitometer. Although the usual fermentation period is seven to nine days, all the samples were considerably shortened rather than the usual fermentation period, and were equivalent fermentation period as the result indicates.

TABLE 28

|  | #7-1 | #7-2 | #7-3 |
|---|---|---|---|
| NITROGEN OF THE FREE AMINO ACID (mg/L) | 124 | 128 | 125 |

Table 28 shows the quantity of the nitrogen of the free amino acid form in the pre-fermentation liquid before adding the yeast in this embodiment. In both the sample of #7-2 using pea proteins, and the sample of #7-3 using soybean protein, compared with #7-1, values were increased slightly.

For alcoholic beverage without using malts or any barley, wheat, etc. at all like the above embodiment 1-7, it is possible it not only contributes pea protein to the foam stability, but that the feature such as the refreshing drinkability of aftertaste originated from malt alcoholic beverages such as beer and low-malt beer was reinforced, and it has contributed to process of the alcoholic beverage of a desirable flavor as a result. Thus, this is in accord with the experiment result by the above-mentioned embodiment.

Furthermore, a flavor like the smell of sulfide or acidity was reduced, and properties which the scent of ester and a mellow taste were characterized by malt alcoholic beverages such as beer and low-malt beer were reinforced by using at least 0.5% of pea protein as the above-mentioned taste evaluation shows.

Eighth Embodiment

In the eighth embodiment, it is shown that pea protein was applied to process of the alcoholic beverage of a low-malt beer. Following is steps to implement the embodiment.

1. Syrup 50 kg, pea proteins 350 g, and hop pellets 500 g were added to 310 L of the wort which added 57 degrees Celsius of hot water to 15 kg of malt, and performed mashing process, and the mashing mixture was boiled for 60-90 minutes. Then, spent hops etc. was removed from the heated mashing mixture by the settling tank called Whirlpool, the remaining mixture was cooled by the plate cooler to 10 degrees Celsius, and the pre-fermentation liquid was obtained.

2. Then, the brewers' yeast was added in this pre-fermentation liquid, and it was made to ferment at 6-15 degrees Celsius for 5-15 days. Then, it stored at −1 degrees Celsius. Dosing the kieselguhr, fermentation liquid was filtrated, removed the yeast, and brewed low malt beer with 5.0 volume % (#8-1).

3. Furthermore, as comparison, only pea protein was removed from the pre-fermentation liquid, and a control of low-malt beer (#8-2) was obtained.

4. The foam stability experiment was carried out like precedent embodiments and the result compared with control is shown in Table 29. Also in this embodiment, it proved that the foam stability was improving as compared with #8-2 which did not use pea protein.

TABLE 29

| THE PROPORTION OF MATERIALS | EIGHTH EMBODIMENT | |
|---|---|---|
|  | #8-1 | #8-2 |
| THE RATE OF USE OF MALT (%) | → | 24 |
| THE RATE OF USE OF SYRUP (%) | → | 76 |
| PEA PROTEIN (ppm) | 1000 | 0 |
| NIBEM | 265 | 255 |

The present invention is not limited to the specifically disclosed embodiments, and variations and modifications may be made without departing from the scope of the present invention. More specifically, it will become spirits if the concentration of the above-mentioned alcohol beverage is adjusted so that the amount of extract may be less from 2%, and a flavor etc. is added after a fermentation process, it is also easily possible to make it liqueur.

The invention claimed is:

1. A method for producing an alcoholic beverage with foaming properties comprising:
    (a) mashing and liquefying malts, or malts and adjuncts into a mash,
    (b) filtering said mash to obtain a wort,
    (c) adding hops to said wort and boiling said wort to create a pre-fermentation liquid,
    (d) fermenting said pre-fermentation liquid using a brewers' yeast to obtain an alcoholic beverage,
    (e) filtering said alcoholic beverage with foaming properties after fermenting,
    wherein a pea protein is added during (a) to the mash, (b) to the wort, (c) to the pre-fermentation liquid and (d) to the alcoholic beverage or between (a) and (b) to the mash, (b) and (c) to the wort, (c) and (d) to the pre-fermentation liquid, and (d) and (e) to the alcoholic beverage;
    wherein said pea protein is from green peas of the species *Pisum Sativum L* and
    wherein said alcoholic beverage has a higher NIBEM value than a beverage made by an otherwise identical process that does not add green pea protein.

2. A method for producing an alcoholic beverage with foaming properties comprising:
    (a) preparing a pre-fermentation liquid using a syrup containing sources of carbon, sources of nitrogen, hops, a coloring matter and water as raw materials,
    (b) fermenting said pre-fermentation liquid with a brewers' yeast to obtain an alcoholic beverage with foaming properties,
    (c) filtering said alcoholic beverage with foaming properties after fermenting,
    wherein a pea protein is added during (a) to the pre-fermentation liquid and (b) to the alcoholic beverage or between (a) and (b) to the pre-fermentation liquid and (b) and (c) to the alcoholic beverage;
    wherein said pea protein is from green peas of the species *Pisum Sativum L* and
    wherein said alcoholic beverage has a higher NIBEM value than a beverage made by an otherwise identical process that does not add green pea protein.

3. A method for producing an alcoholic beverage with foaming properties by fermenting a pre-fermentation liquid, wherein a pea protein is added to said pre-fermentation liquid;

wherein said pea protein is from green peas of the species *Pisum Sativum L* and wherein said alcoholic beverage has a higher NIBEM value than a beverage made by an otherwise identical process that does not add green pea protein.

4. A method for producing an alcoholic beverage with foaming properties by fermenting a pre-fermentation liquid created from mashed raw materials containing malts, wherein a pea protein is added to said pre-fermentation liquid;

wherein said pea protein is from green peas of the species *Pisum Sativum L* and wherein said alcoholic beverage has a higher NIBEM value than a beverage made by an otherwise identical process that does not add green pea protein.

5. An alcoholic beverage with foaming properties produced according to the method of claim 1.

6. An alcoholic beverage with foaming properties produced according to the method of claim 2.

7. An alcoholic beverage with foaming properties produced according to the method of claim 3.

8. An alcoholic beverage with foaming properties produced according to the method of claim 4.

* * * * *